(12) United States Patent
Rauser et al.

(10) Patent No.: US 7,794,685 B2
(45) Date of Patent: Sep. 14, 2010

(54) METHOD FOR PRODUCING HYDROGEN AND SULPHURIC ACID

(75) Inventors: Wolf-Christoph Rauser, Frankfurt (DE); Michael Gasik, Helsinki (FI); Heljä Peltola, Pori (FI); Pekka Taskinen, Espoo (FI)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 12/523,230

(22) PCT Filed: Jan. 17, 2008

(86) PCT No.: PCT/FI2008/050010
§ 371 (c)(1),
(2), (4) Date: Jul. 15, 2009

(87) PCT Pub. No.: WO2008/087252
PCT Pub. Date: Jul. 24, 2008

(65) Prior Publication Data
US 2010/0061922 A1   Mar. 11, 2010

(30) Foreign Application Priority Data
Jan. 19, 2007   (FI) .................................. 20070054

(51) Int. Cl.
C01B 3/02   (2006.01)
C01B 17/74   (2006.01)
(52) U.S. Cl. .................................. 423/522; 423/648.1
(58) Field of Classification Search .................. 423/522, 423/648.1
See application file for complete search history.

(56) References Cited

U.S. PATENT DOCUMENTS

| 4,059,496 A | 11/1977 | Schulten et al. |
| 4,089,940 A | 5/1978 | Norman et al. |
| 4,212,855 A * | 7/1980 | Kerner et al. ............... 423/522 |
| 4,412,895 A | 11/1983 | Lu |
| 2010/0068127 A1 * | 3/2010 | Schoubye .................... 423/522 |

FOREIGN PATENT DOCUMENTS

| JP | 08-071365 A | 3/1996 |
| JP | 2005-219033 A | 8/2005 |

OTHER PUBLICATIONS

Junhu Zhou et al., "Thermal efficiency evaluation of open-loop SI thermochemical cycle for the production of hydrogen, sulfuric acid and electric power", International Journal of Hydrogen Energy, 2007, pp. 567-575, paragraph 2.2, vol. 32, Elsevier Ltd.

* cited by examiner

*Primary Examiner*—Timothy C Vanoy
(74) *Attorney, Agent, or Firm*—Buchanan Ingersoll & Rooney PC

(57) ABSTRACT

The invention relates to a method for producing gaseous hydrogen and strong sulphuric acid (97-100 wt-%) simultaneously from sulphur dioxide gas and water. Sulphur dioxide gas stream is divided into two separate sub-streams, the first sub-stream is routed for water decomposition in a partial thermochemical cycle of the hydrogen and sulphuric acid production and the second sub-stream is fed to the oxidation of the sulphur dioxide to sulphur trioxide.

17 Claims, 3 Drawing Sheets

METHOD FOR PRODUCING HYDROGEN AND SULPHURIC ACID

FIELD OF THE INVENTION

Figure 1:
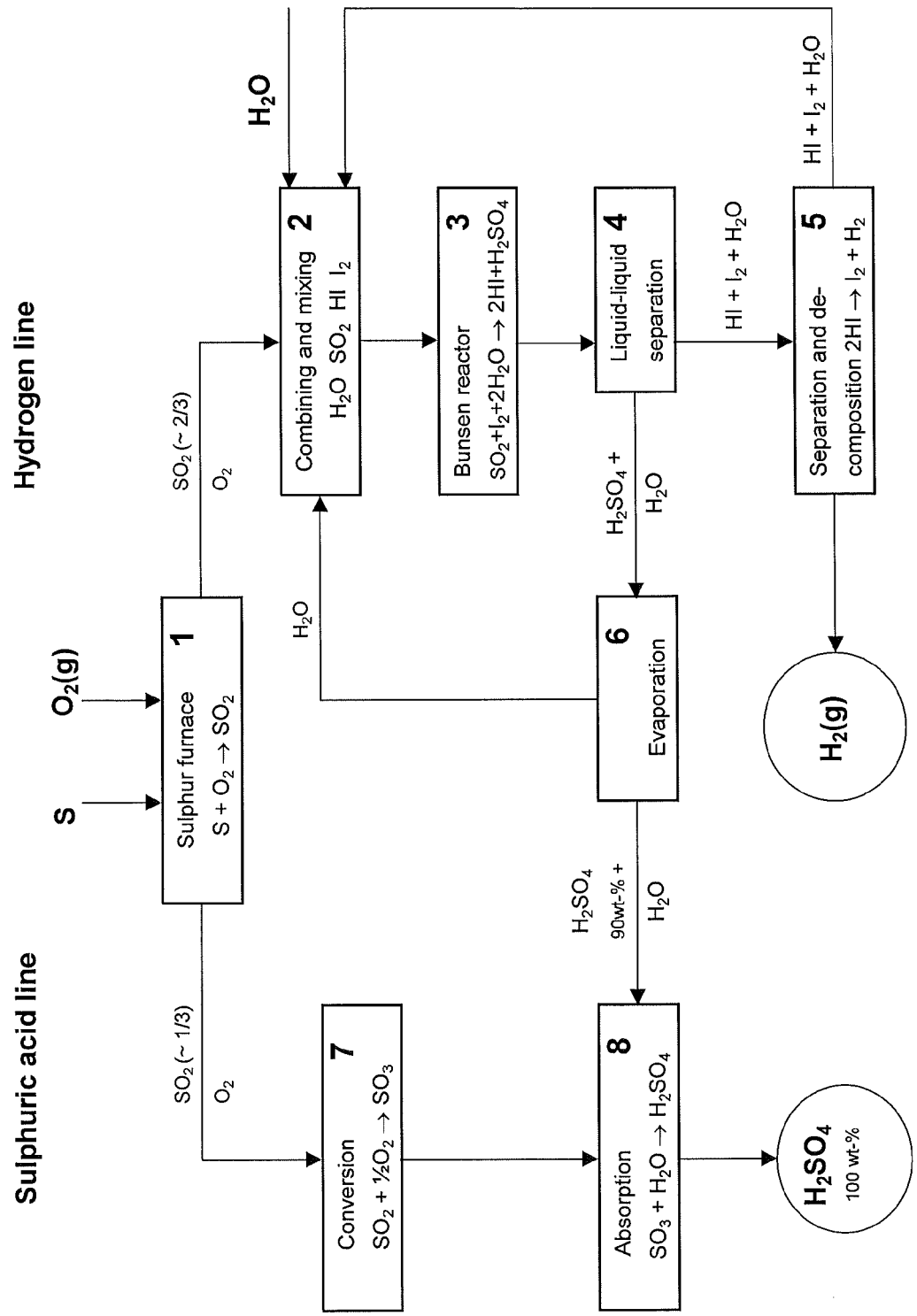

The present invention relates to a method for producing simultaneously hydrogen and strong sulphuric acid from a sulphur bearing feedstock.

BACKGROUND OF THE INVENTION

The growth of global demand of energy, and the necessity to master greenhouse emissions, may lead to the introduction of a new and universal energy carrier, hydrogen. Today most of energy production comes from hydrocarbons: oil (18%), coal (30%) and natural gas (48%), and only about 4% comes from water by electrolysis. In a long term the prospected lack of fossil resources leaves only water and maybe renewable biomass as the sustainable candidate for hydrogen production.

Research on thermochemical water-splitting cycles began about 40 years ago, and since that time hundreds of technical articles about them have been published. More than 200 thermochemical cycles have been reported, and a number of them have been evaluated quantitatively by computer model simulations. A search program, which uses only the free energies of formation has been developed to find new thermochemical cycles.

One of the major efforts in the development of these cycles was done at the Joint Research Centre at Ispra (Varese, Italy). The program was approved by the Council of Ministers of the European Communities and covered the period 1973-1983. In another ten-year program in the USA (Gas Research Institute), a very simplified evaluation of 200 distinct thermochemical cycles was made, and finally eight cycles were operated successfully with recycled materials to achieve proof-to-principle.

The most promising way to produce hydrogen without producing $CO_2$ is splitting water by high temperature energy from the sun, nuclear sources, or waste heat in thermochemical cycles. There water is decomposed into hydrogen and oxygen via a chemistry using intermediate substances, which are cycled, and the energy needed is introduced as heat. About 100 thermochemical cycles have been found. Four of them were assessed for further development: first the hybrid sulphur cycle—'the Westinghouse cycle', and then its three close challengers, the Ispra Mark 13 hybrid cycle, the UT-3 cycle, and the sulphur-iodine (S—I) cycle.

Except for the UT-3 cycle, the main reaction in the most promising thermochemical processes is the decomposition of sulphuric acid (1), which is endothermic and takes place at high temperature.

$$H_2SO_4=H_2O+SO_2+\tfrac{1}{2}O_2 \qquad (1)$$

This reaction is complemented by other reactions, which then close the thermochemical cycle in its variants as:

Westinghouse Electric Corporation pursued the development of a closure, which is called a hybrid sulphur cycle (HyS process) because one of the reactions (2) is electrochemical.

$$2H_2O+SO_2+(elec)=H_2SO_4H_2 \qquad (2)$$

The hybrid sulphur cycle is described for example in U.S. Pat. No. 4,412,895.

Generals Atomics pursued the development of a sulphur-iodine cycle, and determined the conditions under which the products of the Bunsen reaction of water, iodine and sulphur dioxide form two phases, one rich in HI and the other rich in $H_2SO_4$. The cycle, consisting of the Bunsen reaction (3) and the decomposition reaction (4), is also known today as the "GA process". The process is described for example in U.S. Pat. No. 4,089,940.

$$2H_2O+SO_2+I_2=H_2SO_4+2HI \qquad (3)$$

$$2HI=I_2+H_2 \qquad (4)$$

The Ispra Mark 13 is a hybrid cycle and a complete bench-scale continuous process was built and operated at Ispra. The reactions in this closure are:

$$2H_2O+SO_2+Br_2=H_2SO_4+2HBr \qquad (5)$$

$$2HBr+(elec)=Br_2+H_2 \qquad (6)$$

The UT-3 process, being invented at the University of Tokyo in the 1970s, and selected by JAERI (Japan Atomic Energy Research Institute, Ibaraki, Japan) for a further development, consists of four gas-solid reactions: two Ca-compounds reactions (7), (8) and two Fe-compounds reactions (9), (10). This process is operated in a cyclic manner in which the solids remain in their reaction vessels and the flow of gases is switched when the desired extent of reaction is reached.

$$CaBr_2+H_2O=CaO+2HBr \qquad (7)$$

$$CaO+Br_2=CaBr_2+\tfrac{1}{2}O_2 \qquad (8)$$

$$Fe_3O_4+8HBr=3FeBr_2+4H_2O+Br_2 \qquad (9)$$

$$3FeBr_2+4H_2O=Fe_3O_4+6HBr+H_2 \qquad (10)$$

From the four thermochemical cycles above, the Ispra Mark 13 cycle has not been studied anymore in the recent years, and the same concerns the adiabatic UT-3 cycle, which is no longer the focus of JAERI's investigations in this area, either. So, recently the S—I and HyS cycles are favoured in the world in comparison with other known thermochemical cycles studied over the last 35 years.

The most energy demanding part of the thermochemical cycles is the splitting of $H_2SO_4$ (to $SO_2+H_2O+\tfrac{1}{2}O_2$), which forms during the cycle. The original invention, as well as further developments of the S—I cycle, suggest the application of nuclear energy as the primary heat source, and this is the case concerning the HyS process, too.

Efficiencies (thermal to hydrogen) in the range of $\eta=47$-$56\%$ have been calculated for the full process of the sulphur-iodine cycle, and it has been shown that thermochemical cycles have potential to deliver overall system efficiencies in excess of 40%. This is much lower than the efficiency an electrolysis producing hydrogen by water splitting. The efficiency of electric power conversion (electricity to hydrogen) is currently about 80%.

The sulphur-iodine (S—I) cycle can be split into the following reactions (11)-(17), in which the temperatures between brackets are approximate and depend upon the pressure which is not necessarily uniform in the different parts of the cycle. The practical stoichiometrics are:

$$(9I_2)_l+(SO_2)_g+(16H_2O)_l \rightarrow (2HI+10H_2O+8I_2)_l+(H_2SO_4+4H_2O)_l\ [120°\ C.] \qquad (11)$$

$$L_2: (2HI+10H_2O+8I_2)_l \rightarrow (2HI)_g+(10H_2O+8I_2)_l\ [230°\ C.] \qquad (12)$$

$$(2HI)_g \rightarrow H_2+(I_2)_l\ [330°\ C.] \qquad (13)$$

$$L_1: (H_2SO_4+4H_2O)_l \rightarrow (H_2SO_4)_l+(4H_2O)_g\ [300°\ C.] \qquad (14)$$

$$(H_2SO_4)_l \rightarrow (H_2SO_4)_g\ [360°\ C.] \qquad (15)$$

$$(H_2SO_4)_g \rightarrow (SO_3)_g + (H_2O)_g [400° C.] \quad (16)$$

$$(SO_3)_g \rightarrow (SO_2)_g + \tfrac{1}{2}O_2 [870° C.] \quad (17)$$

Reaction (11), named the Bunsen reaction, forms the first section. It proceeds exothermically in the liquid phase and produces two immiscible aqueous acid phases whose compositions are indicated between brackets: $L_1$ phase which is aqueous sulphuric acid and $L_2$ phase, named $HI_x$, which is a mixture of hydrogen iodide, iodine and water. The Bunsen reaction, as it has been written in (11), involves an excess of both water and iodine, with the reference to stoichiometric amounts. The excess of water is required to make the reaction spontaneous, and the excess of iodine induces the phase separation, which is a key point of the process. Such excesses, however, are quite unfavourable for the following $HI_x$ section as well as for the energy balance.

Reactions (14)-(17) belong to the second section. Reactions (15)-(17) proceed in the gas phase and produce $H_2O$, $SO_2$ and $O_2$. These gases are cooled down prior to being bubbled in the Bunsen reactor for separating oxygen from $SO_2$ and $H_2O$. Alternatively, oxygen can be separated from the gas before it enters the Bunsen reactor. HI decomposition according to (13) must be achieved from the $HI_x$ mixture produced in the previous Bunsen reaction. This acid section appears to be the best known step of the cycle, because of the experience gained in the sulphuric acid industry. Sulphuric acid is concentrated through a series of flashes starting from low pressure. It is then dehydrated, before $SO_3$ is decomposed into $SO_2$. This decomposition being only partial, undecomposed $SO_3$ is recombined with water, which allows to recover its heat content.

The third section is formed by reactions (12) and (13). In reaction (12), HI is separated from $L_2$. This separation is the most critical stage of the cycle. Reaction (13) is the thermal decomposition of HI. It has also been proposed to perform reactions (12) and (13) in the same reactive distillation column.

The hybrid sulphur process (HyS, the Westinghouse process) is an all-fluids, two-step thermochemical cycle, involving hydrogen production electrolytically, and decomposition of sulphuric acid as another process step. The net result of the two reactions is the decomposition of water into its constituents, hydrogen and oxygen.

The system has three main processing units:
- a $SO_2$ depolarized electrolysis tank for producing gaseous hydrogen and a water-sulphuric acid mixture,
- a sulphuric acid concentration and decomposition step, and separation of $O_2$ from $SO_2$ before introducing $SO_2$ back into the electrolysis tank.

The first step of the HyS process involves hydrogen production in an electrochemical cell by reaction (18). Sulphur dioxide is oxidized on the anode of an electrochemical cell, while protons are reduced on the cathode is to produce hydrogen. The electrolyte used in the cell is sulphuric acid, and sulphur dioxide is used to scavenge the anode.

$$SO_2 + 2H_2O \rightarrow H_2SO_4 + H_2 [\text{electrochemical}, 80\text{-}120° C.] \quad (18)$$

The theoretical equilibrium voltage required to decompose water under standard conditions (25° C., infinite dilution) is $E^0_{H2/H2O} = 1.23$ V, and the commercial direct water electrolyzers, which have to deal with system efficiency and overvoltage, operate with 1.8-2.6 V per cell. The presence of sulphur dioxide depolarizes the anode and reduces the reversible voltage relative to that required for the direct dissociation of water.

The acid decomposition step involves multiple process operations, including preheating, acid concentration, acid vaporization, acid dissociation, and sulphur trioxide decomposition as is presented earlier by reactions (15)-(17). This process step is common to all sulphur-based thermochemical cycles, so the results obtained in the development of this section of the sulphur-iodine process can be directly applied to the HyS cycle, too.

After the sulphuric acid decomposition unit, the oxygen thermally decomposed from $SO_3$ is removed from the stream. The separated sulphur dioxide is recycled to the electrolysis tank, and oxygen is either used in some other process or vented.

The original thermochemical cycles described above have been developed to with the application of nuclear energy in mind and the application of $SO_2$ without recycling and decomposition of sulphuric acid has not been discussed in this connection.

In the prior art there is also described in JP 2005219033 a method, which removes sulphur oxide from a gas and utilizes it for hydrogen and sulphuric acid production. Sulphur-oxide containing gas is discharged from a furnace such as a coal/oil burning boiler, metal refining furnace and sulphur furnace. Sulphur oxide containing gas is contacted with bromine and water, which results forming of sulphuric acid and a gas containing hydrogen bromide (HBr) and water. Iron bromide ($FeBr_2$) and water are reacted to form ferric oxide ($Fe_3O_4$) hydrogen bromide and hydrogen. Ferric oxide and hydrogen bromide are reacted to generate bromine and iron bromide. Bromine is used to contact sulphur oxide gas and iron bromide to form hydrogen. The method seems to be a modification of the UT-3 process.

JP 8071365 relates to a method to use an oxidation/reduction system in the desulphurization of sulphur oxide containing exhaust gas for obtaining sulphuric acid and hydrogen as byproducts. Exhaust gas is contacted with a sulphur dioxide absorbing solution containing dissolved iodine in water. The solution forms two layers the light phase containing sulphuric acid and the heavy phase hydrogen iodide. Hydrogen iodide is electrolyzed to produce hydrogen and iodine. Separated iodine is reused for absorbing sulphur dioxide gas. The light phase containing sulphuric acid is concentrated. The method is a modification of SI process without sulphuric acid decomposition.

Both cited Japanese methods produce sulphuric acid in addition to hydrogen. However, each mole of sulphuric acid in the light phase ($H_2SO_4/H_2O$) is initially accompanied with 5 moles of water, which means that the acid is dilute acid, which is not a commercial product. There is said in JP 8071365 that the sulphuric acid will be concentrated but not said how it takes place. As is known, concentration by water evaporation does not succeed above 60 to mol-% ($\approx 90$ wt %) and for a commercial product (100 wt %) the acid has to be concentrated in a sulphuric acid plant. So the sulphuric acid production with said method is not possible without connection to sulphuric acid plant.

OBJECT OF THE INVENTION

The function of the present invention is to avoid recycling and decomposition of sulphuric acid in the production of hydrogen. Instead of decomposing sulphuric acid, the invention relates to a method in which sulphur dioxide gas is used for producing hydrogen simultaneously with concentrated sulphuric acid (93-100 wt %) or oleum (sulphuric acid with free $SO_3$). Dependency of any sulphuric acid plant can be avoided by dividing the sulphur dioxide gas stream to two sub-streams wherein the first sub-stream is routed for the production of hydrogen and sulphuric acid and the second sub-stream to produce sulphur trioxide, which is used for concentrating the sulphuric acid to strong sulphuric acid (preferably 97-100 wt %).

BRIEF DESCRIPTION OF THE INVENTION

The essential features of the invention are characterized in the claims.

The present invention relates to a method for producing gaseous hydrogen and strong sulphuric acid simultaneously from sulphur dioxide gas and water. Sulphur dioxide gas stream is divided into two separate sub-streams, the first sub-stream is routed for water decomposition in a partial thermochemical cycle of the hydrogen and sulphuric acid production and the second sub-stream is fed to the oxidation of the sulphur dioxide to sulphur trioxide.

The partial thermochemical cycle here refers to a cycle without its high temperature step of sulphuric acid decomposition.

The sulphuric acid formed in the partial thermochemical cycle is first concentrated by evaporation. The final concentration to strong sulphuric acid (97-100 wt %) takes place with the Sulphur trioxide formed in the oxidation of the second sub-stream of the sulphur dioxide. The amount of the sulphur dioxide routed to the first sub-stream is in at least 40% of the total amount. The quantity of the second stream depends on the strength or concentration degree of the sulphuric acid from the evaporation step.

The source of sulphur dioxide may be any technically feasible feedstock, such as elementary sulphur or hydrogen sulphide, which are converted to sulphur dioxide. The oxidant is preferably oxygen. The source may also be sulphur dioxide, either as a result of sulphur combustion or as a by-product of a sulphide smelter or roaster, or a $SO_2$-enrichment step of an industrial process gas cleaning plant. Also any other sulphur source, which can be converted to $SO_2$, may be used as feedstock of the method. The sulphide is preferably at least one of the group: copper, nickel, zinc, lead or iron sulphide.

The partial thermochemical cycle utilized in the present method may be any of the possible processes using sulphur as a constituent and sulphuric acid as an intermediate product, such as the sulphur-iodine cycle or hybride sulphur cycle.

LIST OF FIGURES

Figure 2:
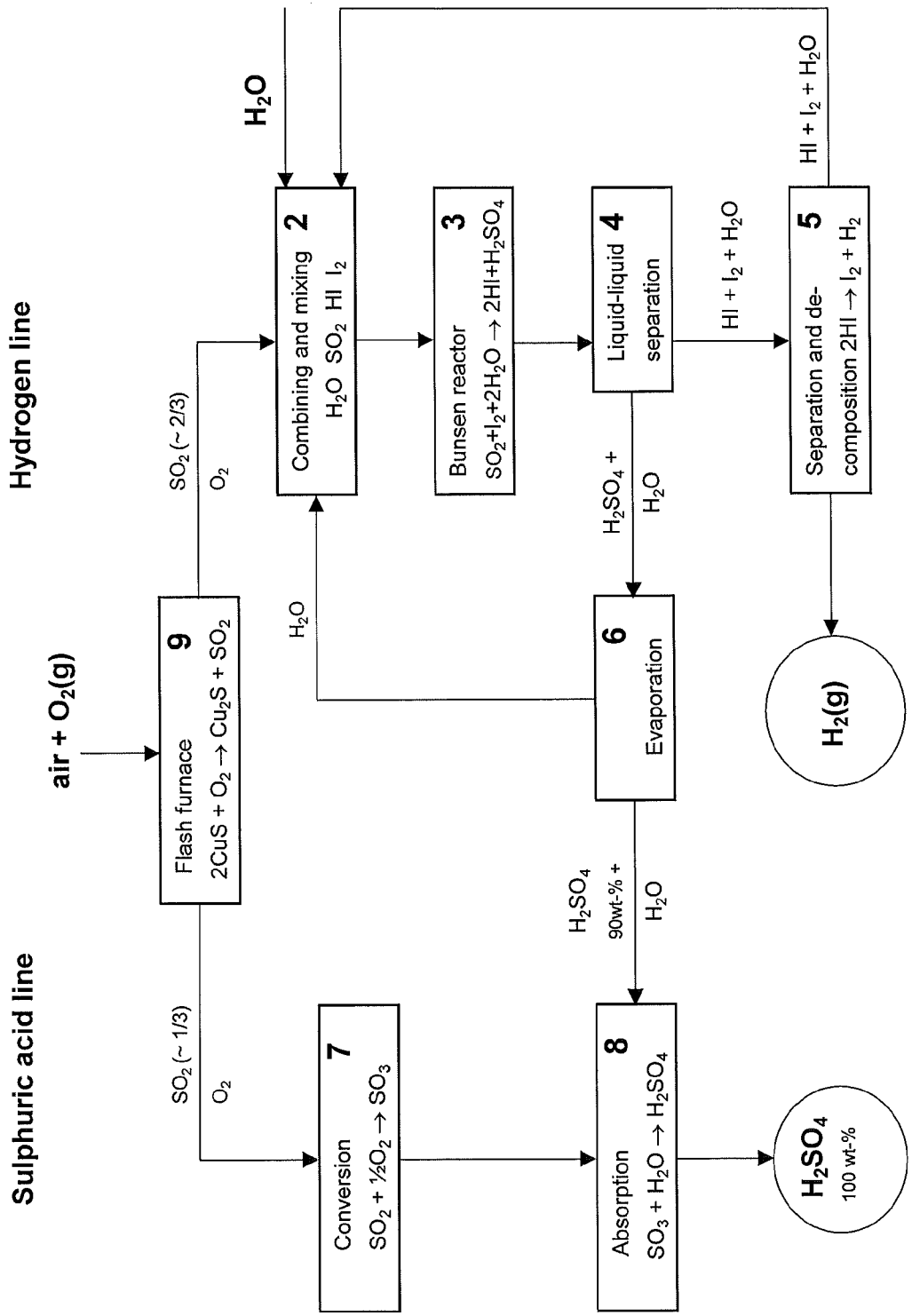
Figure 3:
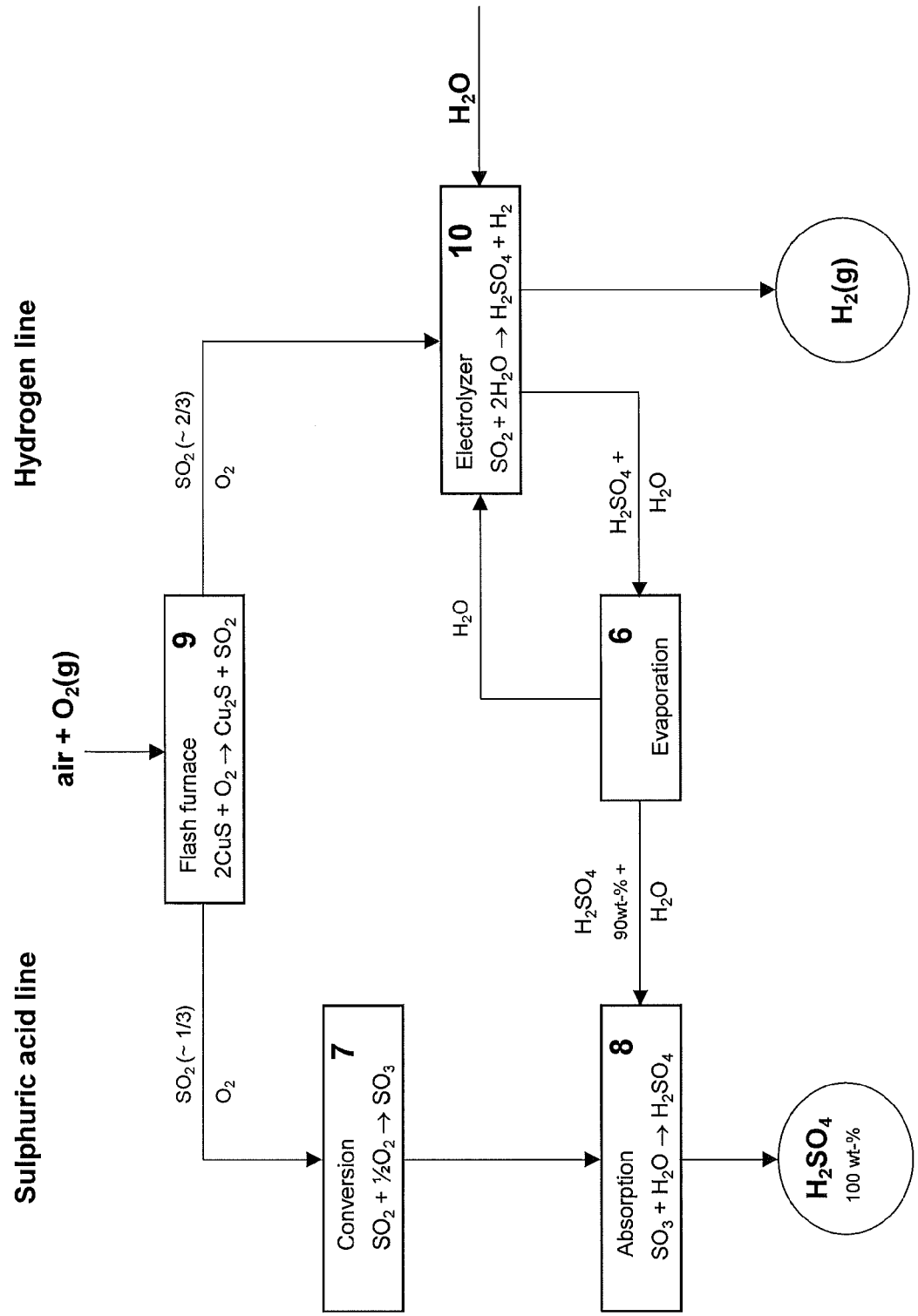

FIG. 1 shows a flowsheet of a preferred method according to the invention,

FIG. 2 presents a flowsheet of another preferred method according to the invention, and FIG. 3 shows a flowsheet of third preferred method according to the invention.

DETAILED DESCRIPTION OF THE INVENTION

The main disadvantage in the prior art methods has been the big energy requirement of the sulphuric acid decomposition since it consumes roughly over 60% of the heat energy of the hydrogen production and only minor than to 40% is consumed in the decomposition of water. The methods described in the cited Japanese patent publications avoid sulphuric acid decomposition but however the production according to them must take place in connection of a sulphuric acid plant since the sulphuric acid produced is not commercial product as such.

The invention according to the present method reveals a new possibility to produce independently and cost-effectively both hydrogen and strong sulphuric acid (100%). In practice the acid content of the strong sulphuric acid is between 97-100 wt % though it is mentioned in the specification to be 100 wt %. It is also possible to produce oleum with the present method.

Some preferable process alternatives have been described in the light of the flowsheets. Elementary sulphur has been used as a feedstock of sulphur dioxide in FIG. 1. However, also hydrogen sulphide can be used as a source of sulphur. Sulphur is converted to sulphur dioxide by combusting it with oxygen in a sulphur furnace 1. The figures describing the process have been simplified and they do not reveal all details. It is however preferential that the formed sulphur dioxide gas is cleaned from solids before dividing to two separate streams.

The first substream of the created sulphur dioxide and possibly a small amount of oxygen, which has been used in excess, is routed to a Hydrogen line and there to a combining and mixing reactor 2 where water is fed and a recycled composition of hydrogen iodide, elementary iodine and water. The amount of the first sub-stream is at least 40% of the total sulphur dioxide stream.

The mixed composition of sulphur dioxide, water and iodine with its compounds is directed to a so-called Bunsen reactor 3. The Bunsen reaction (11) operates with excess water and also with excess iodine to allow the separation of reaction products $H_2SO_4$ and HI in the form of two immiscible to liquid phases ($H_2SO_4/H_2O$ and $HI/I_2/H_2O$). The reaction temperature is about 120° C. Separation of the two phases takes place in a settler 4. The heavy phase containing hydrogen iodide, iodine and water is routed to a separation and decomposition stage 5. The light phase consisting of dilute sulphuric acid and water is directed to an evaporation stage 6.

Each mole of sulphuric acid in the light phase ($H_2SO_4/H_2O$) is initially accompanied by an excess of water, typically 4-5 moles. The remaining acid (20 mol %=57 wt %) is concentrated to commercial grades. The first part of the concentration takes place in the evaporation stage 6. This is done to at least 40 mol % (≈78 wt %) and preferably at least 60 mol % (≈90 wt %) in a series of e.g. five flash evaporators (four heated flashes at 7.5 bar and one adiabatic flash to 3 bar), and then the acid passes through a 1 atm vaporizer to the absorption towers of the acid plant. Pure water is removed in the overhead of the flashes and this is returned to the Bunsen reactor 3. Low pressure steam from acid cooling in the absorption unit is applied in the acid concentration section (flash evaporators). Higher acid concentrations require high pressure steam which is gained from the sulphur combustion.

In the combustion of liquid elementary sulphur to generate $SO_2$, pure oxygen (technical grade oxyge=90-100% $O_2$) is preferably used. This allows a greater efficiency of the Bunsen reactor, and it also enables the recirculation of unconverted $SO_2$ and oxygen back into the sulphur combustion furnace.

The second sub-stream of the sulphur dioxide formed in the sulphur furnace 1 is directed to a Sulphuric acid line and further to sulphur trioxide conversion stage 7. It is advantageous to use pure oxygen under pressure for the $SO_2$ to $SO_3$ conversion in the sulphuric acid line. The adaption of this kind of an absorption technology is necessary because the low concentrated acid from the S—I stage would inevitably lead to strong mist formation.

To avoid the mist formation, the diluted sulphuric acid from the evaporation (6) can be used as a substitute for the conventional make-up water for the sulphuric acid which come from the absorption stage (8) of the second sub-stream. In this case, the $SO_3$ is absorbed in concentrated sulphuric acid as in conventional plants and this higher concentrated acid is mixed with the diluted acid from the evaporator to get the desired concentration.

At least half % of the generated $SO_2$ goes into the S—I section to produce acid at a strength of at least 78 wt %. The remaining part, the second sub-stream goes directly to the conversion stage, and is converted into $SO_3$. The created sulphur trioxide is absorbed to the sulphuric acid cycled from the evaporation stage 6 in an absorption stage 8. In the absorption stage the content of the sulphuric acid is raised to the level of 97-100 wt %. As was said before, the ratio in which the $SO_2$ is routed to each line depends totally on the efficiency of the evaporation stage. But it is also possible to control the concentration of the sulphuric acid by the distribution of the $SO_2$ gas to the sub-streams or compensate lacking efficiency of the evaporation state with other distribution of $SO_2$ into the sub-streams.

The pressure contact in the conversion stage 7 is planned to use the inline technology concept, in which the individual process steps are carried out in tubes and pipes rather than in individual vessels. However, the capital cost of the modified acid plant corresponds the cost of a conventional acid plant. The production costs are competitive with the prior art.

FIG. 2 shows a flowsheet, in which the sulphur bearing feedstock is a copper sulphide concentrate, which is combusted in a flash furnace 9 by means of oxygen containing gas to copper matte and sulphur dioxide gas. It is clear that the sulphide can also be another sulphide or roaster can be used instead of smelter. The created sulphur dioxide gas is divided to two sub-streams and treated in the same way as described in the connection with FIG. 1.

The sulphur bearing feedstock is also in the flowsheet of FIG. 3 a copper sulphide concentrate, which is combusted in a flash furnace 9 and the created sulphur dioxide gas is divided to two sub-streams as explained before but the production of hydrogen from the $SO_2$ includes decomposing of water electrolytically in an electrolyzer 10. The hydrogen is so produced by using partial HyS cycle. In addition to hydrogen, sulphuric acid is formed, too, and it is routed to evaporation stage 6 and treated as described in the connection of FIG. 1.

It is clear that the partial HyS line can also be used when the source of the sulphur dioxide is elementary sulphur as described in FIG. 1 or any other possible source mentioned before.

The invention claimed is:

1. A method for producing simultaneously gaseous hydrogen and sulphuric acid from sulphur dioxide gas and water, wherein the sulphur dioxide gas stream is divided to two sub-streams, the first of them is fed with water to a partial thermochemical cycle for production of hydrogen and sulphuric acid and the second sub-stream is fed to the oxidation of the sulphur dioxide to sulphur trioxide, which is used for concentrating the sulphuric acid created from the first sub-stream.

2. A method according to claim 1, wherein the created sulphuric acid is first concentrated by evaporation.

3. A method according to claim 1, wherein the concentrated sulphuric acid is further concentrated to strong sulphuric acid (97-100 wt %) with the sulphur trioxide formed in the oxidation of the second sub-stream.

4. A method according to claim 1, wherein the concentrated sulphuric acid is further concentrated to oleum with the sulphur trioxide formed in the oxidation of the second sub-stream.

5. A method according to claim 1 wherein the amount of the first sub-stream is at least 40% of the total sulphur dioxide gas stream.

6. A method according to claim 1, wherein a source of the sulphur dioxide gas is elementary sulphur or hydrogen sulphide, which are converted with oxygen to sulphur dioxide.

7. A method according to claim 1, wherein a source of the sulphur dioxide gas is a by-product of a sulphide smelter.

8. A method according to claim 1, wherein a source of the sulphur dioxide gas is a by-product of a sulphide roaster.

9. A method according to claim 7, wherein the sulphide is at least one of the group: copper, nickel, zinc, lead or iron sulphide.

10. A method according to claim 1, wherein the sulphur dioxide gas is cleaned before dividing.

11. A method according to claim 1, wherein a source of the sulphur dioxide gas is a sulphur dioxide enrichment step of an industrial process gas cleaning plant.

12. A method according to claim 1, wherein the partial thermochemical cycle for hydrogen production is the sulphur-iodine (S—I) cycle.

13. A method according to claim 1, wherein the partial thermochemical cycle for hydrogen production is the electrolytical hybride-sulphur (HyS) cycle.

14. A method according to claim 1, wherein pure oxygen is used for the oxidation of sulphur dioxide.

15. A method according to claim 2, wherein the concentrated sulphuric acid is further concentrated to strong sulphuric acid (97-100 wt %) with the sulphur trioxide formed in the oxidation of the second sub-stream.

16. A method according to claim 2, wherein the concentrated sulphuric acid is further concentrated to oleum with the sulphur trioxide formed in the oxidation of the second sub-stream.

17. A method according to claim 8, wherein the sulphide is at least one of the group: copper, nickel, zinc, lead or iron sulphide.

* * * * *